United States Patent
Itokazu

(10) Patent No.: US 12,429,120 B2
(45) Date of Patent: Sep. 30, 2025

(54) WATERPROOF STRUCTURE AND ROBOT

(71) Applicant: FANUC CORPORATION, Yamanashi (JP)

(72) Inventor: Kenta Itokazu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 352 days.

(21) Appl. No.: 18/043,109

(22) PCT Filed: Sep. 24, 2021

(86) PCT No.: PCT/JP2021/034924
§ 371 (c)(1),
(2) Date: Feb. 27, 2023

(87) PCT Pub. No.: WO2022/071075
PCT Pub. Date: Apr. 7, 2022

(65) Prior Publication Data
US 2023/0313868 A1    Oct. 5, 2023

(30) Foreign Application Priority Data
Sep. 29, 2020  (JP) ................. 2020-163445

(51) Int. Cl.
| B25J 19/00 | (2006.01) |
| F16H 25/22 | (2006.01) |
| F16H 25/24 | (2006.01) |
| F16H 25/20 | (2006.01) |

(52) U.S. Cl.
CPC ...... F16H 25/2204 (2013.01); B25J 19/0075 (2013.01); F16H 25/2418 (2013.01); *F16H 2025/2031* (2013.01)

(58) Field of Classification Search
CPC ... F16H 25/2418; B25J 9/044; B25J 19/0075; B25J 19/0083
See application file for complete search history.

(56) References Cited

U.S. PATENT DOCUMENTS 11,548,172 B2 *   1/2023  Ikema ................. B25J 19/0083

FOREIGN PATENT DOCUMENTS

| JP | 2001039320 A | * | 2/2001 |
| JP | 2010280019 A |   | 12/2010 |
| JP | 2012228733 A |   | 11/2012 |
| JP | 2020044560 A |   | 3/2020 |

* cited by examiner

*Primary Examiner* — Gregory Robert Weber
(74) *Attorney, Agent, or Firm* — Maier & Maier, PLLC

(57) ABSTRACT

A waterproof structure including an extension shaft disposed at an upper side of a vertically extending ball screw spline shaft so as to be coaxial with the ball screw spline shaft, a cylindrical cover member that covers the extension shaft and the ball screw spline shaft and is configured to be extended and shortened in a direction along a longitudinal axis of the extension shaft, and a rotary connection unit that connects the ball screw spline shaft and the extension shaft to each other so that the ball screw spline shaft and the extension shaft are configured to rotate relative to each other around the longitudinal axis, where an upper end of the cover member is fixed to an upper end of the extension shaft.

10 Claims, 4 Drawing Sheets

WATERPROOF STRUCTURE AND ROBOT

TECHNICAL FIELD

The present invention relates to a waterproof structure and a robot.

BACKGROUND

Heretofore, a bellows-shaped cover member that covers a ball screw spline (BS) shaft and is able to be extended and shortened in the longitudinal direction of the BS shaft has been used in waterproof structures for horizontally articulated (SCARA) robots (for example, refer to Japanese Unexamined Patent Application Publication No. 2012-228733, Japanese Patent No. 5444858, Japanese Patent No. 5792988). In Japanese Unexamined Patent Application Publication No. 2012-228733, Japanese Patent No. 5444858, Japanese Patent No. 5792988, an extension shaft is connected to an upper end of the BS shaft, and the BS shaft and the extension shaft are covered by the cover member.

SUMMARY

An aspect of the present disclosure provides a waterproof structure. The waterproof structure includes an extension shaft disposed at an upper side of a vertically extending ball screw spline shaft so as to be coaxial with the ball screw spline shaft; a cylindrical cover member that covers the extension shaft and the ball screw spline shaft and is able to be extended and shortened in a direction along a longitudinal axis of the extension shaft; and a rotary connection unit that connects the ball screw spline shaft and the extension shaft to each other so that the ball screw spline shaft and the extension shaft are able to rotate relative to each other around the longitudinal axis, wherein an upper end of the cover member is fixed to an upper end of the extension shaft.

DETAILED DESCRIPTION OF THE EMBODIMENTS

Figure 1:
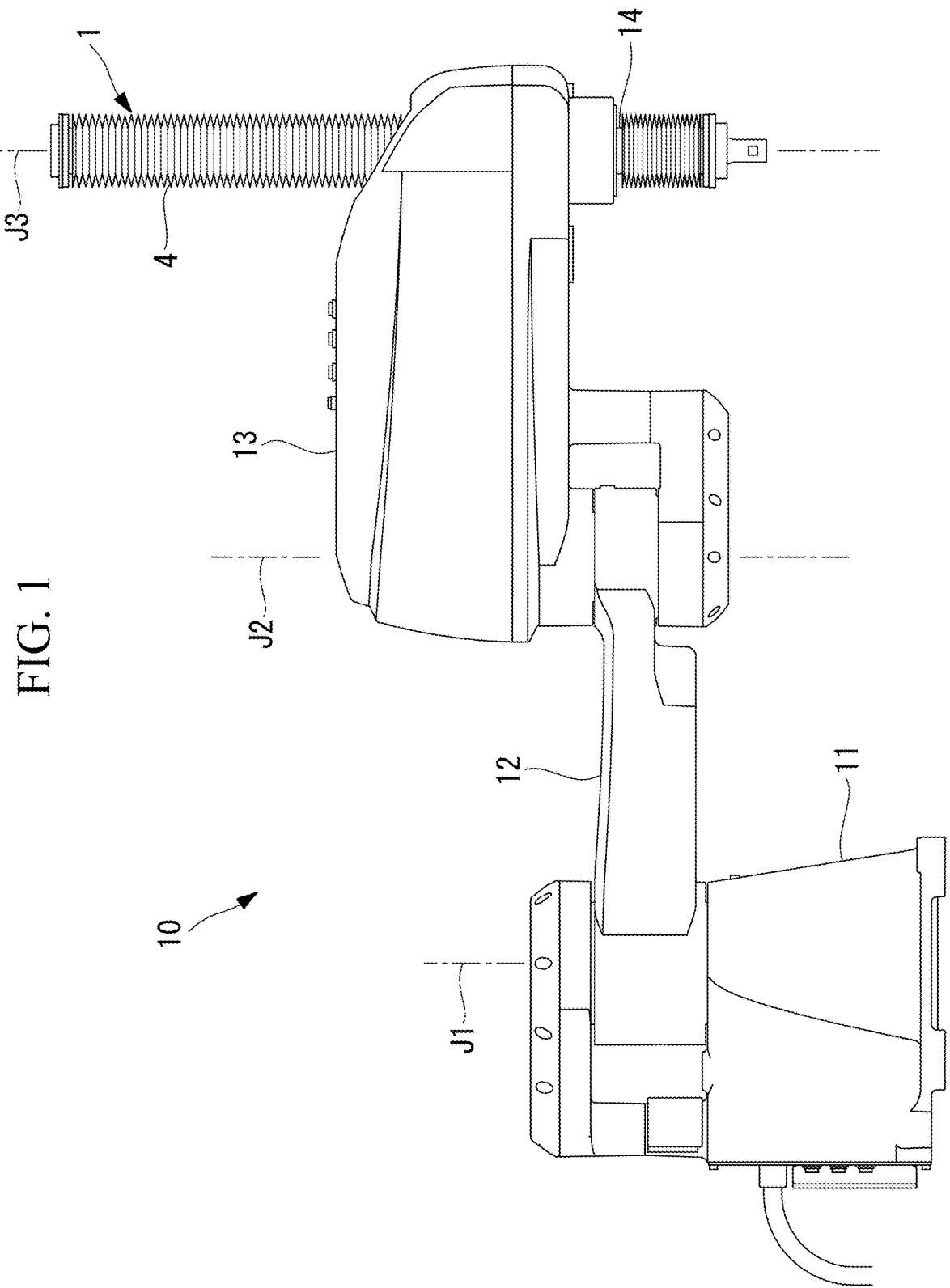
FIG. 1 is a side view of a robot according to an embodiment.

An BS shaft and an extension shaft rotate in an integrated manner around the longitudinal axis of the BS shaft. An upper end of a cover member is attached to an upper end of the extension shaft via a bearing so as to prevent the cover member from twisting due to rotation of the BS shaft. In this case, a rotation seal is provided in order to form a seal between the upper end of the extension shaft and the upper end of the cover member so as to protect the bearing from dust and water. If the rotation seal is an oil seal, an oil seal having special specifications with low sliding resistance is required in order to prevent the cover member from twisting. This results in an increase in cost. If the rotation seal is a labyrinth seal, the waterproofing performance will be inferior to that obtained with an oil seal.

Hereinafter, a waterproof structure 1 and a robot 10 according to an embodiment will be described while referring to the drawings.

Figure 2:
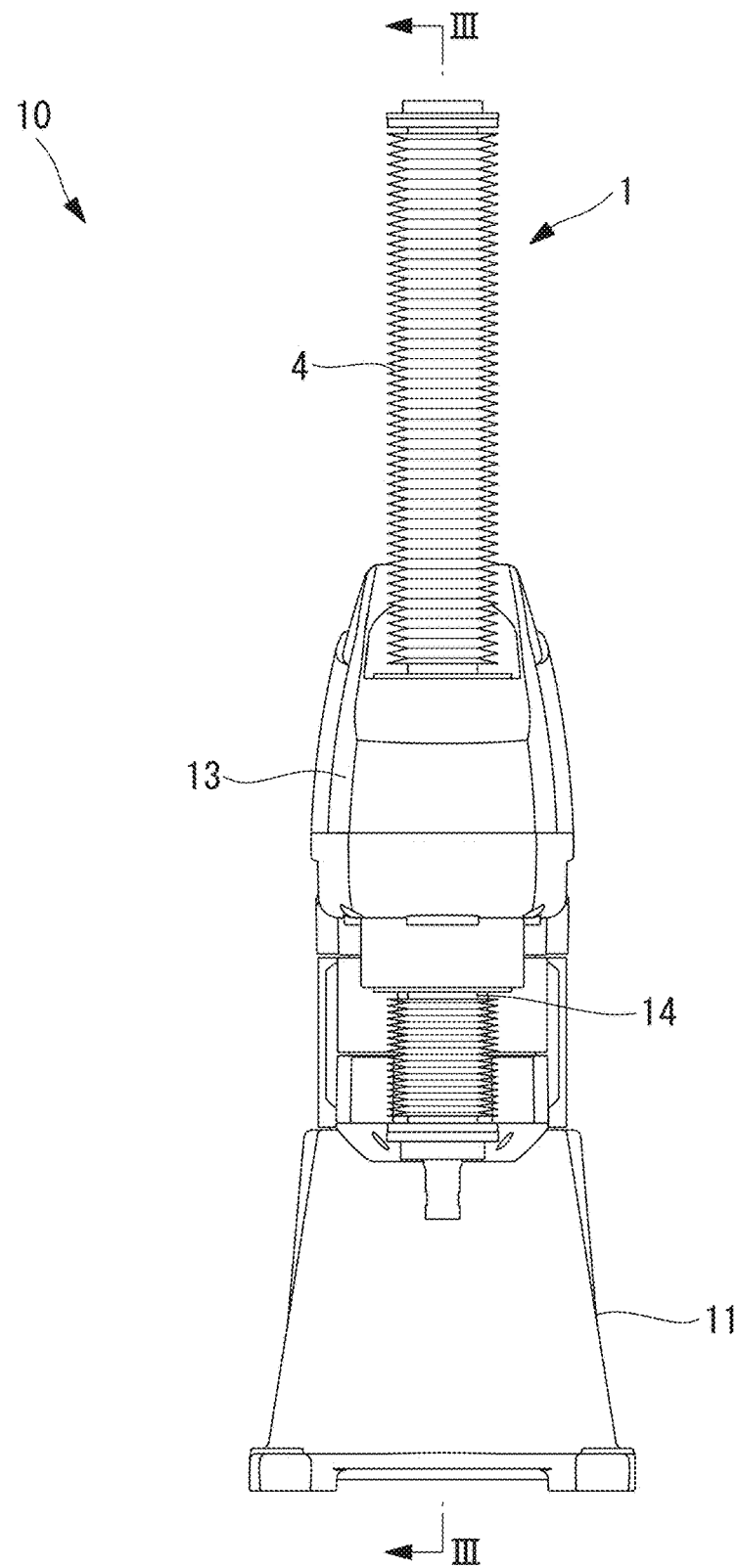
FIG. 2 is a front view of the robot in FIG. 1.

As illustrated in FIGS. 1 and 2, the robot 10 is a horizontally articulated robot that includes a base 11, a first arm 12, a second arm 13, and a ball screw spline (BS) shaft 14.

The base 11 is fixed to an installation surface.

One end of the first arm 12 is supported by the base 11 so as to be able to rotate around a vertical first axis J1. The first arm 12 can rotate horizontally with respect to the base 11.

One end of the second arm 13 is supported by the other end of the first arm 12 so as to be able to rotate around a vertical second axis J2. The second arm 13 can rotate horizontally with respect to the first arm 12.

The BS shaft 14 is supported by the other end of the second arm 13 so as to be able to move linearly in the vertical direction along a third axis J3, which is the longitudinal axis of the BS shaft 14, and so as to be able to rotate around the third axis J3. A tool such as a hand (not illustrated) is connected to the lower end of the BS shaft 14. The BS shaft 14 is a hollow circular tube that is open at least at the upper end thereof. A cable such as wiring for a tool can be passed through the inside of the BS shaft 14.

Thus, the vertically extending BS shaft 14 passes through the second arm 13 and moves vertically with respect to the second arm 13. Therefore, a hole (not illustrated) is formed in an upper wall of a cover of the second arm 13. The BS shaft 14 passes through this hole. The robot 10 further includes the waterproof structure 1. The waterproof structure 1 is for preventing water from entering the inside of the second arm 13 through the hole.

Figure 3:
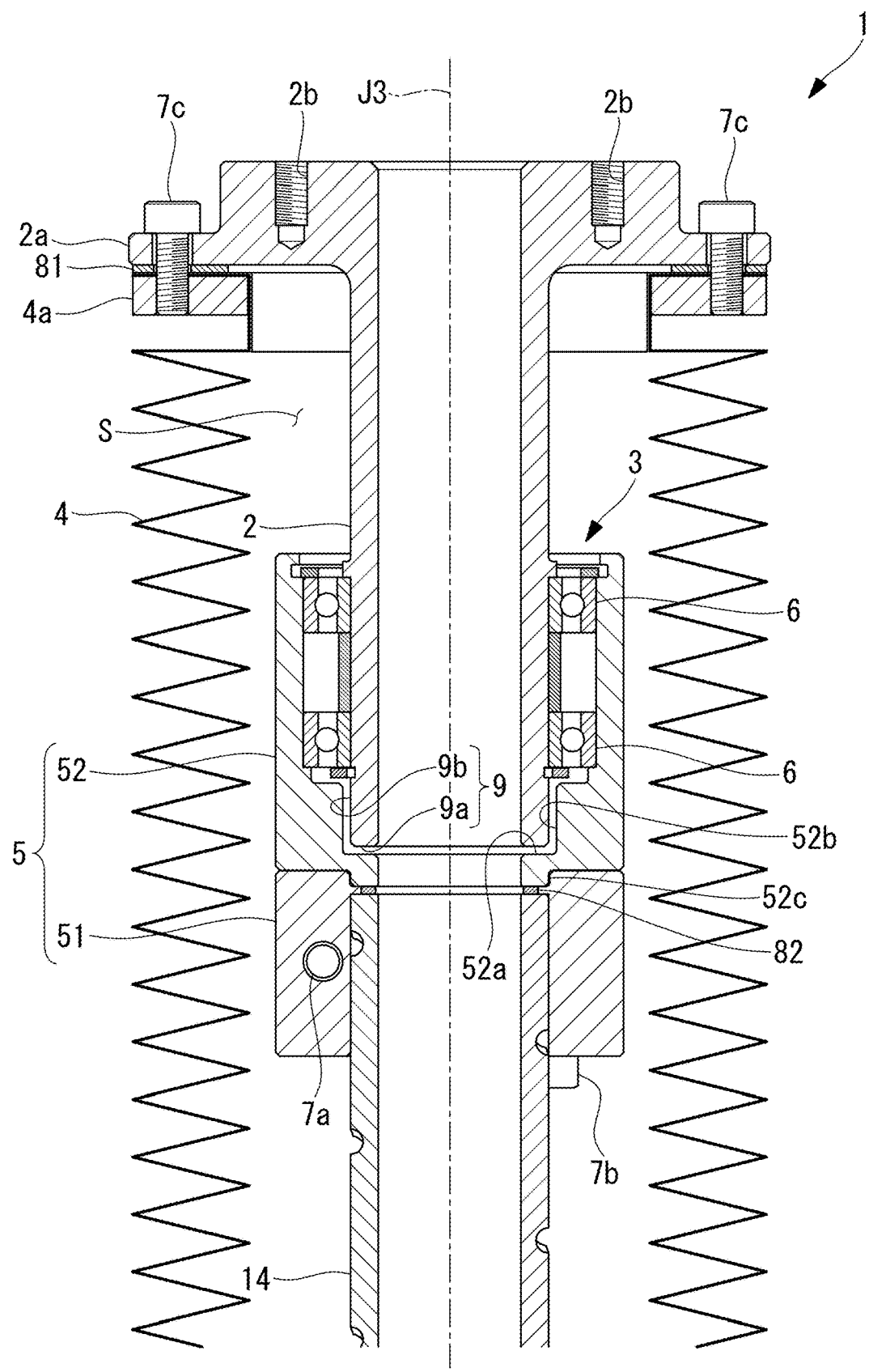
FIG. 3 is a sectional view illustrating the configuration of a waterproof structure and is a partial longitudinal sectional view of the robot taken along line III-III in FIG. 2.

As illustrated in FIG. 3, the waterproof structure 1 includes an extension shaft (for example, a first shaft) 2, a rotary connection unit 3, and a cylindrical cover member 4. The extension shaft 2 is disposed above the BS shaft 14 so as to be coaxial with the BS shaft (for example, a second shaft) 14. The rotary connection unit 3 connects the extension shaft 2 to the BS shaft 14. The cylindrical cover member 4 covers the extension shaft 2 and the BS shaft 14.

When the BS shaft 14 is lowered to its lowest position, the upper end of the BS shaft 14 is lowered to a position close to the upper surface of the cover of the second arm 13. The extension shaft 2 is connected to the upper end of the BS shaft 14. The extension shaft 2 secures a distance to dispose the cover member 4 between the upper surface of the cover of the second arm 13 and the upper end of the extension shaft 2. The extension shaft 2 is a hollow circular tube that is open at both ends. The inside of the extension shaft 2 communicates with the inside of the BS shaft 14.

The rotary connection unit 3 is disposed at a connection part between the BS shaft 14 and the extension shaft 2. The rotary connection unit 3 connects the BS shaft 14 and the extension shaft 2 to each other such that the BS shaft 14 and the extension shaft 2 are able to rotate relative to each other around the third axis J3. Specifically, the rotary connection unit 3 includes a cylindrical bearing holder 5 and a bearing 6. The bearing holder 5 is disposed at a position radially outside of a lower end of the extension shaft 2 and is fixed to the BS shaft 14. The bearing 6 is disposed between an outer peripheral surface of the extension shaft 2 and an inner peripheral surface of the bearing holder 5.

The bearing holder 5 includes a cylindrical first member 51 and a cylindrical second member 52. The first member 51 is disposed at a position radially outward of the upper end of the BS shaft 14 and fixed to the upper end of the BS shaft

14. The second member 52 is disposed at a position radially outward of the lower end of the extension shaft 2 and fixed to the first member 51.

For example, the first member 51 is a cylindrical member and has a slit that divides a part of the first member 51 in a circumferential direction. The first member 51 is fixed to an outer peripheral surface of the upper end of the BS shaft 14 by tightening a bolt 7a across the slit. The first member 51 and the second member 52 are fixed to each other by bolts 7b longitudinally inserted into the first member 51 and the second member 52.

The second member 52 has an inner diameter that is larger than the outer diameter of the extension shaft 2. The bearing 6 is disposed between the outer peripheral surface of the extension shaft 2 and the inner peripheral surface of the second member 52. An inner ring of the bearing 6 is fixed to the extension shaft 2 and an outer ring of the bearing 6 is fixed to the second member 52. The extension shaft 2 and the bearing holder 5 are connected to each other by the bearing 6 so as to be able to rotate relative to each other.

The cover member 4 is bellows-shaped and is able to be extended and shortened in the longitudinal direction. The cover member 4 extends vertically from the upper end of the extension shaft 2 to the upper surface of the cover of the second arm 13, and covers the extension shaft 2 and a protruding part of the BS shaft 14 that protrudes upward from the second arm 13. The rotary connection unit 3 is disposed in a cylindrical space S formed between the shafts 2 and 14 and the cover member 4. The cover member 4 may have a structure other than a bellows-like structure so long as the cover member 4 is able to be extended and shortened in the longitudinal direction while maintaining the space S in a closed state.

The lower end of the cover member 4 is fixed to the upper surface of the cover of the second arm 13, and the hole through which the BS shaft 14 passes is disposed inside the cover member 4. The cover member 4, which covers the hole, prevents liquid from entering the inside of the second arm 13 via the hole.

The upper end of the cover member 4 is fixed to the upper end of the extension shaft 2. Specifically, the upper end of the extension shaft 2 is provided with a circular plate-shaped flange portion 2a, and the upper end of the cover member 4 is provided with a circular plate-shaped flange portion 4a. The flange portion 2a is disposed above the flange portion 4a, and the flange portion 2a and the flange portion 4a are fixed to each other by bolts 7c.

The waterproof structure 1 further includes a seal 81, a seal 82, and a labyrinth seal 9 for improving sealing of the space S and the waterproof performance of the waterproof structure 1.

The seal (first fixed seal) 81 seals the space between the upper end of the extension shaft 2 and the upper end of the cover member 4 and prevents liquid from entering the space S from outside the waterproof structure 1.

Specifically, the seal 81 is disposed between the lower surface of the flange portion 2a and the upper surface of the flange portion 4a. Since the flange portion 2a and the flange portion 4a are fixed parts that are stationary relative to each other, a fixed seal, such as a gasket, is used as the seal 81.

The seal (second fixed seal) 82 seals the space between the BS shaft 14 and the bearing holder 5 and prevents liquid from entering the space S from the insides of the shafts 2 and 14.

Specifically, the lower end surface of the second member 52 is provided with a circular convex portion 52c that fits inside the first member 51, and the lower end surface of the convex portion 52c and the upper end surface of the BS shaft 14 face each other. The seal 82 is disposed between the lower end surface of the convex portion 52c and the upper end surface of the BS shaft 14. The BS shaft 14 and the bearing holder 5 are fixed parts that are stationary with respect to each other. Therefore, a fixed seal, such as an O-ring, is used as the seal 82.

The labyrinth seal 9 is formed of gaps 9a and 9b between the outer surface of the lower end of the extension shaft 2 and the inner surface of the bearing holder 5, and prevents liquid from entering the bearing 6 and the space S from the inside of the extension shaft 2.

Specifically, the inner surface of the second member 52 includes a ring-shaped lower wall 52a that faces a ring-shaped lower end surface of the extension shaft 2 and a cylindrical side wall 52b that extends upward from the outer edge of the lower wall 52a. A horizontal ring-shaped gap 9a is provided between the lower end surface of the extension shaft 2 and the lower wall 52a, and a vertical cylindrical gap 9b is provided between the outer peripheral surface of the extension shaft 2 and the side wall 52b.

The bearing 6 is disposed above the labyrinth seal 9. Liquid that has entered the inside of the extension shaft 2 can penetrate horizontally into the gap 9a, but is prevented by gravity from rising through the gap 9b. Therefore, liquid is prevented from entering the bearing 6, which is above the gap 9b.

Next, function of the waterproof structure 1 and the robot 10 will be described.

During operation of the robot 10, a rotational force is transmitted from a motor (not illustrated) within the second arm 13 to the BS shaft 14, and this rotational force causes the BS shaft 14 to move upward and downward along the third axis J3 while rotating around the third axis J3. The extension shaft 2 also moves upward and downward together with the BS shaft 14. The cover member 4 changes shape so as to be extended and shortened as the upper end of the extension shaft 2 moves upward and downward. The cover member 4 prevents liquid from entering the inside of the second arm 13 from the outside.

Here, the BS shaft 14 and the extension shaft 2 are connected to each other by the rotary connection unit 3 so as to be able to rotate relative to each other. Therefore, only the BS shaft 14 rotates around the third axis J3, whereas the extension shaft 2 and the cover member 4 are stationary with respect to each other and do not rotate around the third axis J3. Therefore, there is no need for an expensive component such as an oil seal to seal the space between the upper end of the extension shaft 2 and the upper end of the cover member 4, and an inexpensive fixed seal 81 such as a gasket can be used to seal the space between the upper end of the extension shaft 2 and the upper end of the cover member 4. This enables high waterproof performance and cost reduction to be realized for the waterproof structure 1.

The space between the BS shaft 14 and the bearing holder 5, which are fixed parts, is sealed by the inexpensive fixed seal 82 such as an O-ring. This enables the waterproof performance of the waterproof structure 1 to be further improved without incurring an increase in cost.

The labyrinth seal 9 is used to seal the space between the lower end of the extension shaft 2 and the bearing holder 5 as a rotating part. If a contact-type rotation seal, such as an oil seal, is used to seal the space between the lower end of the extension shaft 2 and the bearing holder 5, torsional forces acting around the third axis J3 due to the sliding resistance of the rotation seal may be applied to the cover member 4. According to this embodiment, the use of the non-contact-type labyrinth seal 9 enables torsional forces applied to the cover member 4 to be reduced and enables the lifetime of the cover member 4 to be extended.

By disposing the bearing 6 above the labyrinth seal 9, liquid can be reliably prevented from penetrating into the bearing 6 and high waterproofing performance can be achieved for a rotating part with an inexpensive configuration.

Figure 4:
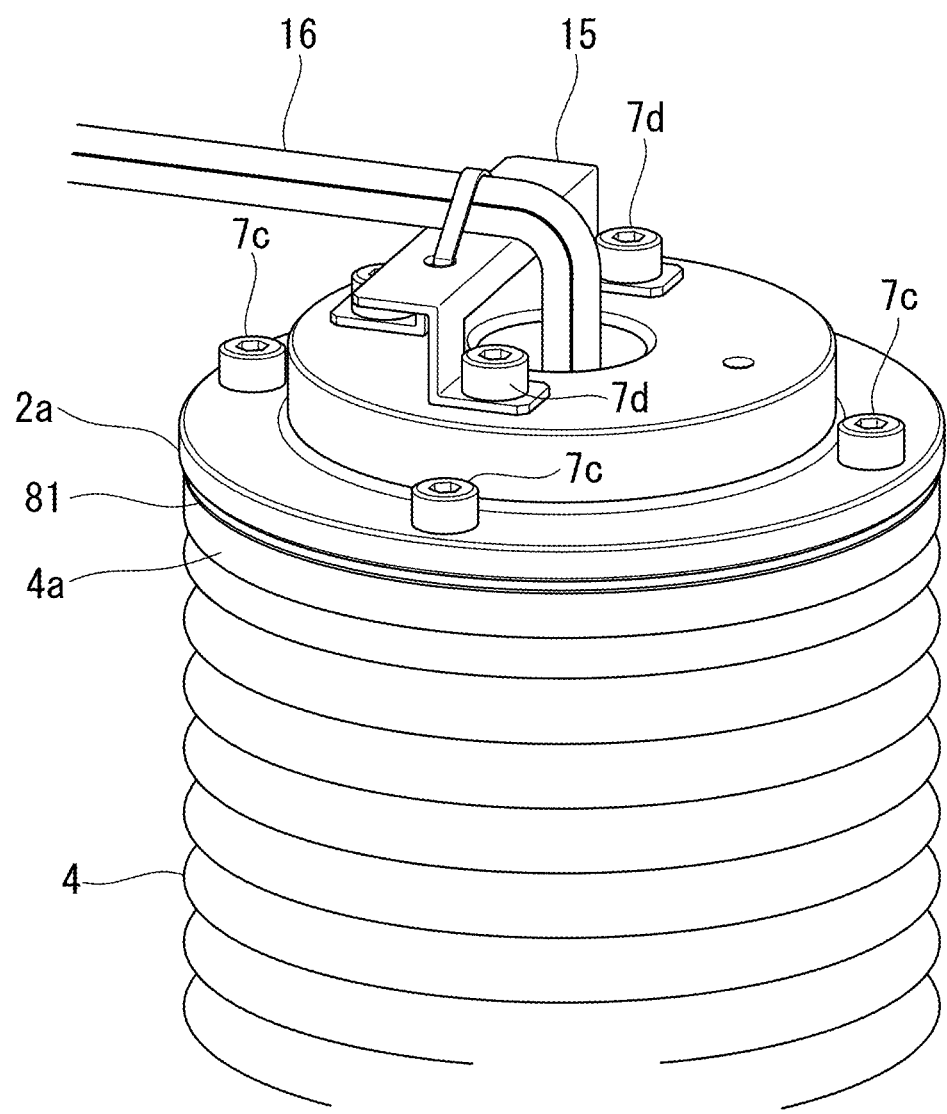
FIG. 4 is a perspective view of an upper end of the waterproof structure.

In this embodiment, as illustrated in FIGS. 3 and 4, the extension shaft 2 may have fixing portions 2b for fixing a cable 16 to the upper end of the extension shaft 2.

For example, the fixing portions 2b are tapped holes that open at the upper end surface of the extension shaft 2, and a fixing member 15 is fixed to the upper end surface of the extension shaft 2 by fastening bolts 7d into the tapped holes 2b. The cable 16 is fed through the shafts 2 and 14 and out from the upper end surface of the extension shaft 2 and is fixed to the upper end of the extension shaft 2 by the fixing member 15.

Since the extension shaft 2 does not rotate around the third axis J3, the cable 16 can be fixed to the extension shaft 2 while preventing twisting of the cable 16.

In this embodiment, the waterproof structure 1 includes the seal 81 that seals the space between the upper end of the extension shaft 2 and the upper end of the cover member 4, but the space between the upper end of the extension shaft 2 and the upper end of the cover member 4 may be sealed using a means other than the seal 81. Since the upper end of the extension shaft 2 and the upper end of the cover member 4 are fixed parts, various means other than a fixed seal, such as a gasket, can be used to seal the space between the upper end of the extension shaft 2 and the upper end of the cover member 4.

In this embodiment, the extension shaft 2 has a hollow tubular shape that is open at the upper end surface, but the extension shaft 2 may instead be a hollow shaft that is closed at the upper end surface or a solid shaft. In this case, the seal 82 and the labyrinth seal 9 do not need to be provided since liquid would be unable to enter the extension shaft 2.

In this embodiment, the robot 10 is a horizontally articulated robot. However, robots to which the waterproof structure 1 may be applied are not limited to horizontally articulated robots, and may be any robot having a vertically extending BS shaft.

In this embodiment, the waterproof structure 1 includes the extension shaft 2 that is connected to the BS shaft 14, but the waterproof structure of the present disclosure can be applied to any structure that has two shafts disposed coaxially in series with each other and that rotate relative to each other. In other words, the waterproof structure may include a cover member that covers a first shaft and a second shaft, which is disposed along the longitudinal axis direction of the first shaft, and that is able to be extended and shortened along the longitudinal axis direction, and a rotary connection unit that connects the first shaft and the second shaft to each other such that the first shaft and the second shaft are able to rotate relative to each other around the longitudinal axis. The waterproof structure preferably further includes a seal that seals at least fixed parts. For example, at least one out of the space between the first shaft and the cover member and the space between the second shaft and the rotary connection unit may be sealed by a seal.

Although embodiments of the present disclosure have been described in detail, the disclosure is not limited to the individual embodiments described above. Various additions, substitutions, changes, partial omissions, and so forth may be made to the embodiments to the extent that the resulting embodiments do not depart from the scope of the present invention or from the idea and purpose of the present invention derived from the claims and equivalents thereto. For example, the order of individual operations and the order of individual processes in the above mentioned embodiments are illustrated merely as examples and are not limited to them. The same also applies when numerical values or equations are used in the above description of the embodiments.

The invention claimed is:

1. A waterproof structure, comprising:
an extension shaft disposed at an upper side of a vertically extending ball screw spline shaft so as to be coaxial with the ball screw spline shaft;
a cylindrical cover member that covers the extension shaft and the ball screw spline shaft and is configured to be extended and shortened in a direction along a longitudinal axis of the extension shaft; and
a rotary connection unit that connects the ball screw spline shaft and the extension shaft to each other so that the ball screw spline shaft and the extension shaft are configured to rotate relative to each other around the longitudinal axis,
wherein an upper end of the cover member is fixed to an upper end of the extension shaft.

2. The waterproof structure according to claim 1, further comprising a first fixed seal that seals a space between the upper end of the extension shaft and the upper end of the cover member.

3. The waterproof structure according to claim 1, wherein the rotary connection unit includes a cylindrical bearing holder disposed at a position radially outside of a lower end of the extension shaft and fixed to the ball screw spline shaft, and
a bearing disposed between an outer peripheral surface of the extension shaft and an inner peripheral surface of the bearing holder.

4. The waterproof structure according to claim 3, further comprising a labyrinth seal formed by a gap between an outer surface of the lower end of the extension shaft and an inner surface of the bearing holder,
wherein the bearing is disposed above the labyrinth seal.

5. The waterproof structure according to claim 3, further comprising a second fixed seal that seals a space between the ball screw spline shaft and the bearing holder.

6. The waterproof structure according to claim 1, wherein the extension shaft includes a fixing portion configured to fix a cable to the upper end of the extension shaft.

7. A robot comprising the waterproof structure according to claim 1.

8. A waterproof structure comprising:
a cover member that covers a first shaft and a second shaft which is disposed along a longitudinal axis of the first shaft and which can be extended and shortened along the longitudinal axis; and
a rotary connection unit that connects the first shaft and the second shaft to each other so that the first shaft and the second shaft are configured to rotate relative to each other around the longitudinal axis,
wherein the rotary connection unit comprises:
a cylindrical bearing holder disposed radially outside the first shaft and fixed to the second shaft; and
a bearing disposed between an inner peripheral surface of the bearing holder and an outer peripheral surface of the first shaft, wherein at least one of a space between the first shaft and the cover member and a space between the second shaft and the rotary connection unit is sealed.

9. The waterproof structure according to claim 8, wherein the second shaft is driven so that the second shaft is rotated around the longitudinal axis relative to the first shaft.

10. The waterproof structure according to claim 8, wherein a shaft comprising the first shaft and the second shaft is protruding, from a predetermined member, in a longitudinal direction along the longitudinal axis,
wherein one end in the longitudinal direction of the cover member is fixed to the first shaft, and the other end in the longitudinal direction of the cover member is fixed to the predetermined member.

* * * * *